(12) United States Patent  
Gobright, IV

(10) Patent No.: US 6,935,703 B1
(45) Date of Patent: Aug. 30, 2005

(54) CONCRETE CUTTING SAW HAVING HIGH AND LOW SPEED BLADE ARBORS

(76) Inventor: Francis M. Gobright, IV, 9553 Knapp Rd., Howell, MI (US) 48855

( * ) Notice: Subject to any disclaimer, the term of this patent is extended or adjusted under 35 U.S.C. 154(b) by 0 days.

(21) Appl. No.: 10/827,733

(22) Filed: Apr. 20, 2004

(51) Int. Cl.[7] .............................................. B28D 1/04
(52) U.S. Cl. ..................................... 299/39.3; 83/493
(58) Field of Search ............................. 299/39.3, 85.1, 299/39.1; 30/369; 83/493, 491, 494

(56) References Cited

U.S. PATENT DOCUMENTS

| | | | |
|---|---|---|---|
| 2,351,755 A | * | 6/1944 | Gettelman .................. 299/39.3 |
| RE24,073 E | * | 10/1955 | Alloway ...................... 83/493 |
| 3,007,688 A | * | 11/1961 | Hatcher ....................... 299/39.3 |
| 3,141,702 A | | 7/1964 | Barton |
| 3,273,939 A | * | 9/1966 | Hatcher ....................... 299/39.3 |
| 3,333,897 A | | 8/1967 | Rhodes |
| 4,664,645 A | | 5/1987 | Muck et al. |
| 5,810,448 A | | 9/1998 | Kingsley et al. |
| 6,318,353 B1 | | 11/2001 | Edwards et al. |

* cited by examiner

Primary Examiner—John Kreck
(74) Attorney, Agent, or Firm—Brooks Kushman P.C.

(57) ABSTRACT

A concrete cutting saw (10) includes a wheeled main frame (12) on which a blade support frame (14) is mounted for movement between upper idle and lower cutting positions. Low and high speed blade arbors (16, 18) are rotatably mounted on the blade support frame (14) and each has an arbor head (24, 26) for selectively and alternately mounting either a low or high speed rotary cutting blade without any blade interference with the other arbor head. A drive mechanism (32) rotatively drives the low and high speed blade arbors (16, 18) at low and high speeds such that concrete cutting can be performed at the best rotational speed for the particular job cutting to be performed.

12 Claims, 4 Drawing Sheets

US 6,935,703 B1

CONCRETE CUTTING SAW HAVING HIGH AND LOW SPEED BLADE ARBORS

BACKGROUND OF THE INVENTION

1. Field of the Invention

This invention relates to a concrete cutting saw for cutting asphalt, concrete or the like.

2. Background Art

Concrete cutting saws are utilized to cut asphalt, concrete and the like. Such saws are conventionally mounted on wheels and are self propelled to move along the intended path that provides the cutting operation. Rotary blades utilized to provide the cutting have different sizes depending upon the depth of cut, the hardness of the composition being cut, the rotary cutting blade speed, and the linear speed at which the cutting is performed. For example, for deep cuts it is usually preferable to initially make a shallow cut with a relatively small diameter rotary blade and then complete the cut with a larger diameter rotary blade. In order to have the same cutting speed between the saw tips and the asphalt or concrete, the larger diameter blades must be rotated slower than the smaller diameter blades because rotating a saw blade at an inappropriate speed can adversely shorten the blade lifetime.

Concrete cutting saws as disclosed by U.S. Pat. Nos.: 4,664,645 Muck et al.; 5,810,448 Kingsley et al.; and 6,318,353 Edwards et al. have previously used transmissions with belts or gears that are adjusted or shifted in order to provide different speeds of rotation of a concrete saw blade arbor so that the rotary cutting blade an be rotated at the appropriate speed. However, due to the complexity involved, such saws have not found widespread commercial acceptance.

See also U.S. Pat. Nos. 3,141,702 Barton and 3,333,897 Rhodes which each disclose pavement or concrete saws having a pair of blades that are simultaneously operated during cutting. Such dual blade saws can result in binding if alignment of the saw blades and movement of the saw is not accurately aligned.

SUMMARY OF THE INVENTION

An object of the present invention is to provide an improved concrete cutting saw for cutting asphalt, concrete, etc. with appropriate cutting blade rotational speed.

In carrying out the above object, a concrete cutting saw constructed in accordance with the invention includes a main support frame having wheels for moving the saw in preparation for cutting, during cutting, and after a concrete sawing operation. A blade support frame of the saw is mounted on the main support frame for movement between an upper idle position and a lower cutting position. Low and high speed blade arbors are rotatably mounted on the blade support frame. These low and high speed blade arbors each have at least one associated arbor head for selectively and alternately mounting either a low speed concrete cutting blade or a high speed concrete cutting blade on the blade support frame without any blade interference with the other arbor head. A drive mechanism of the saw simultaneously rotatively drives the low and high speed blade arbors respectively at low and high speeds such that concrete cutting can be performed by the blade mounted on the selected arbor head for either low or high speed rotation as required by the cutting operation to be performed.

In the preferred construction, the pair of arbor heads are located at one lateral side of the saw. As disclosed, the low and high speed blade arbors each have a pair of arbor heads respectively located at opposite lateral sides of the saw so cutting can be performed on either lateral side of the saw. Furthermore, a spacer and a collar provide mounting of the concrete cutting blade on the selected arbor without interfering with the other arbor head at the adjacent lateral side of the saw.

The saw also includes a blade cover for covering a rotary cutting blade mounted on the associated arbor head. A pair of such blade covers of small and large sizes may be provided for mounting of one at either lateral side of the saw for use with either a larger low speed cutting blade or a smaller high speed cutting blade.

The drive mechanism of the concrete cutting saw includes a drive belt for rotatively driving one of the blade arbors and a pair of drive belts that extend between the low and high speed blade arbors so both blade arbors are rotatively driven. Furthermore, the blade support frame includes an upper cover having a closed position for enclosing the drive mechanism and having an open position for providing access to the drive mechanism. In addition, the blade support frame also includes a lower: cover having a closed position for enclosing the drive mechanism and having an open position for providing access to the drive mechanism.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
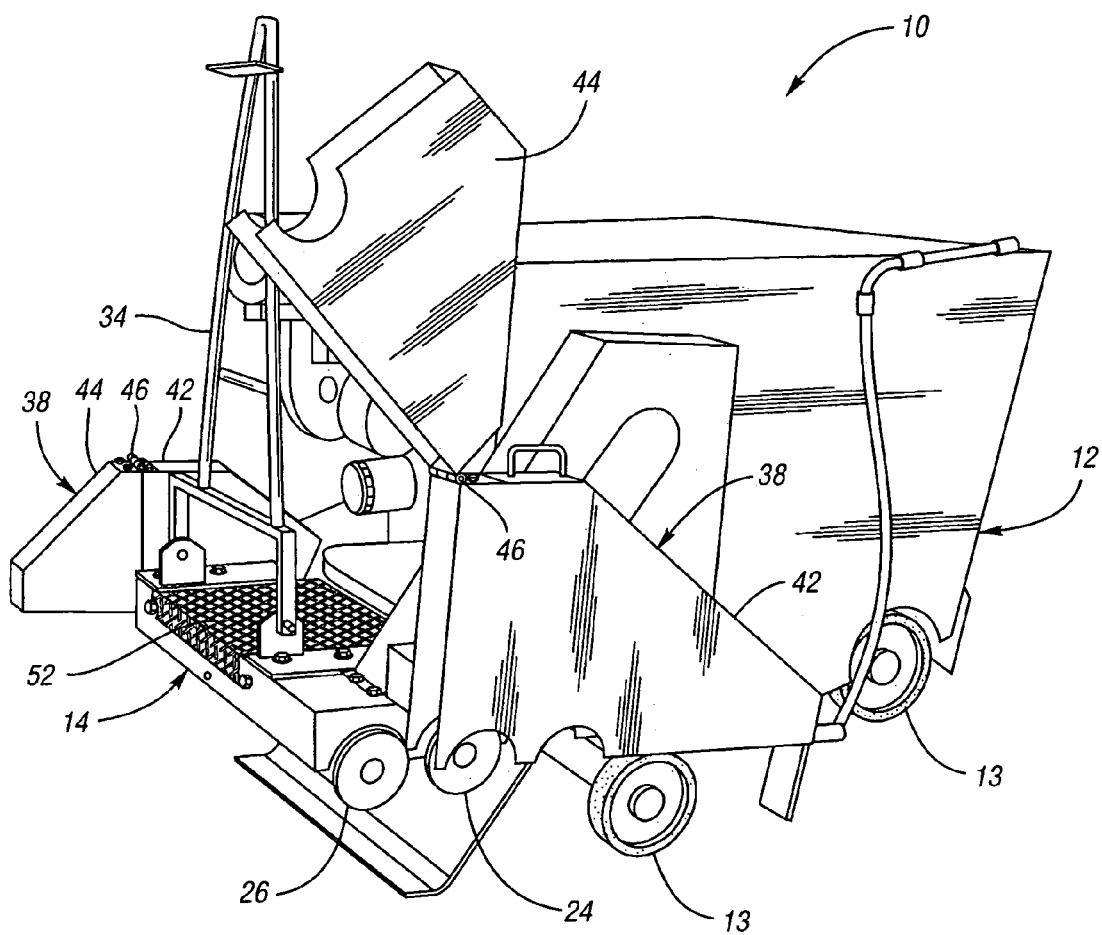
FIG. 1 is a perspective view taken from the front and one lateral side of a concrete cutting saw constructed in accordance with the present invention.

With reference to FIG. 1 of the drawings, a concrete cutting saw generally indicated by 10 is constructed in accordance with the present invention and includes a main support frame 12 having wheels 13 for moving the saw in preparation for cutting, during cutting and after a concrete sawing operation. A drive mechanism conventionally drives one or more of the wheels so that the saw is self propelled, although the saw could be manually moved as well as being self propelled.

Figure 2:
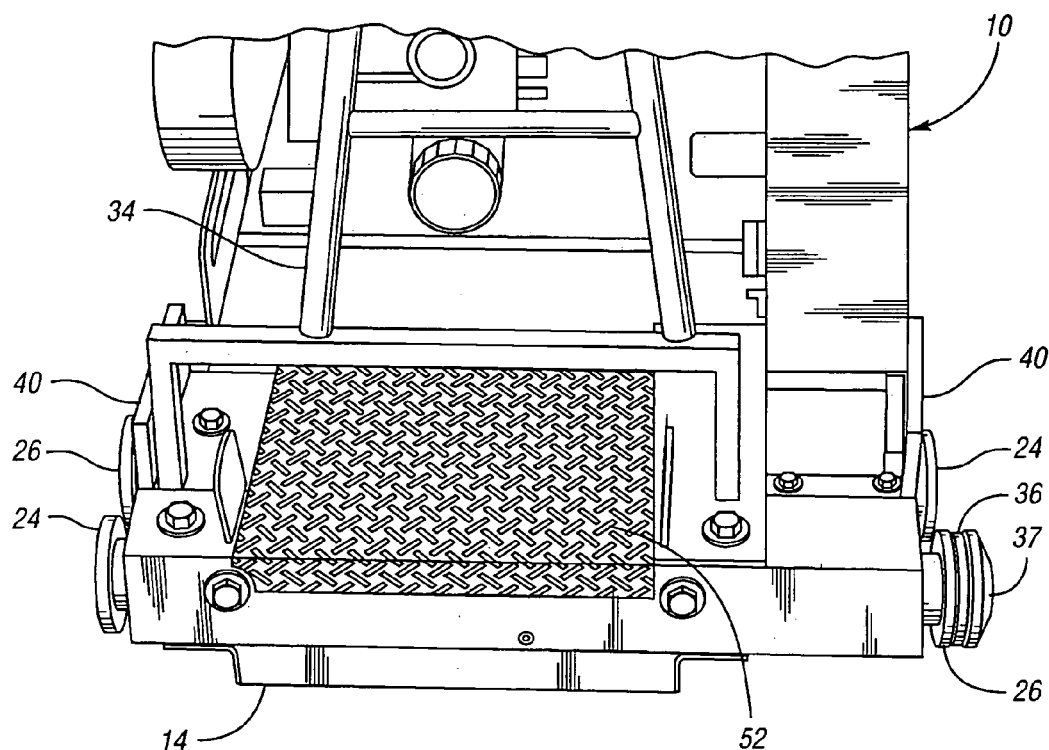
FIG. 2 is a partial perspective view of the concrete cutting saw taken from its front side looking downwardly.
Figure 3:
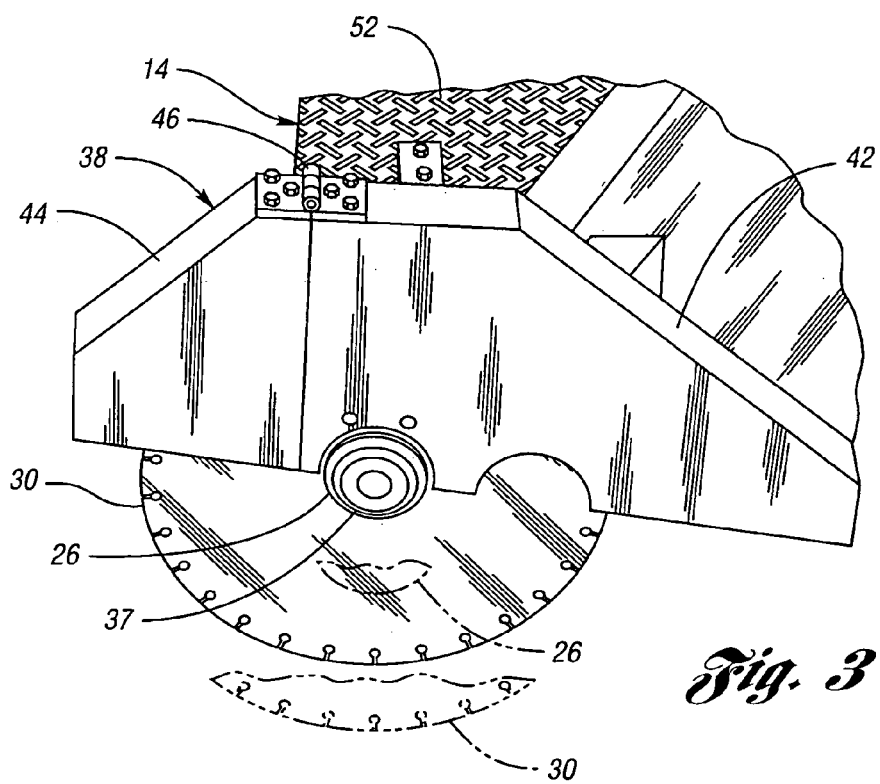
FIG. 3 is another partial perspective view showing a concrete cutting blade mounted on one arbor head of the saw and movable between an upper idle position shown by solid line representation and a lower cutting position shown partially by phantom line representation.
Figure 4:
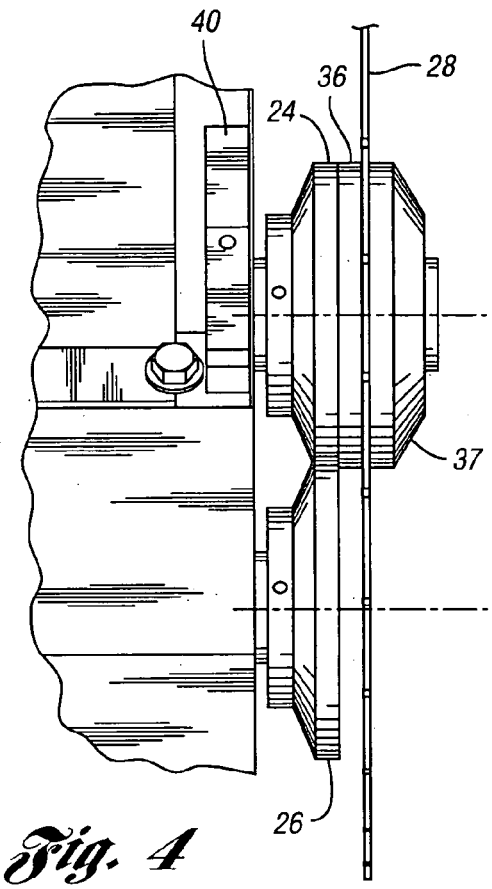
FIG. 4 is another partial perspective view taken at one lateral side of the saw to illustrate the manner in which a rotary cutting blade is mounted on one blade arbor without interfering with another blade arbor that is rotated at a different speed.
Figure 5:
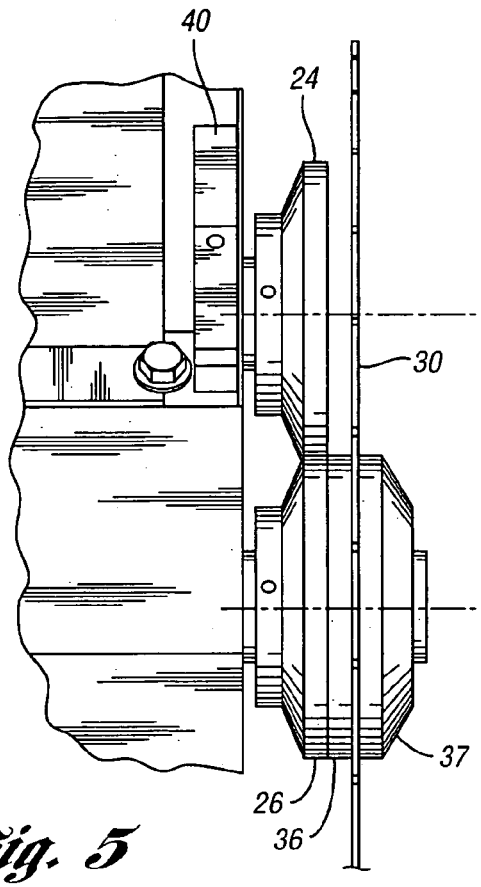
FIG. 5 is another partial perspective view similar to FIG. 4 but showing a rotary cutting blade mounted on the other arbor.
Figure 6:
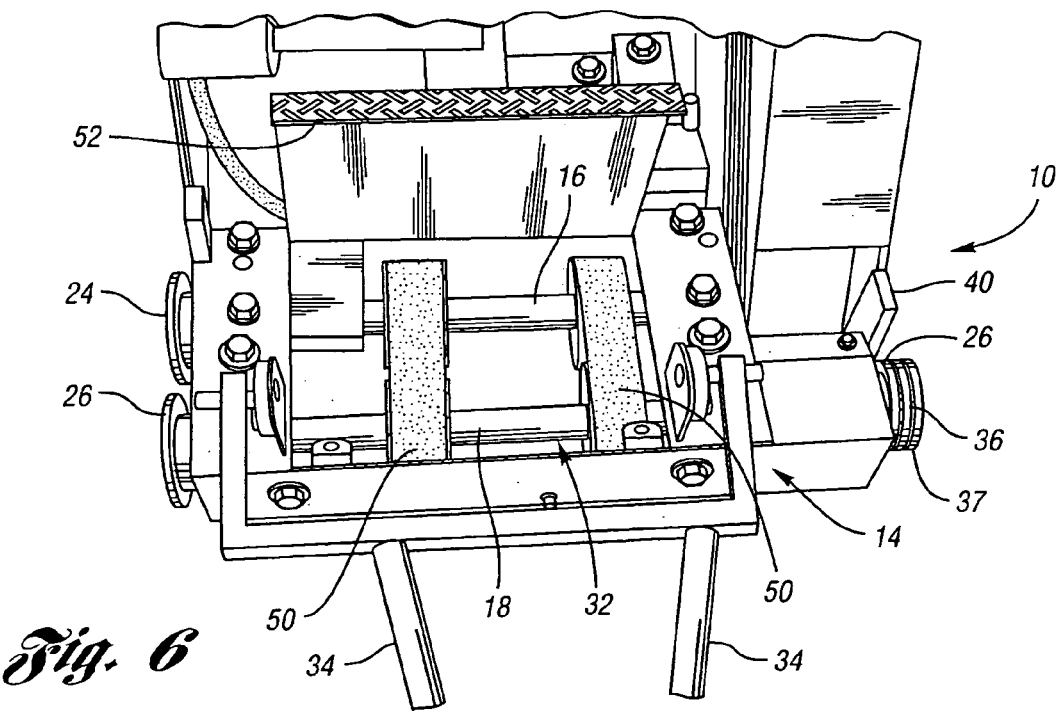
FIG. 6 is a perspective view taken from the front looking downwardly similar to FIG. 2 but with an upper cover of the blade support frame in an open position in order to provide access to a drive mechanism that drives the low and high speed blade arbors of the saw.
Figure 8:
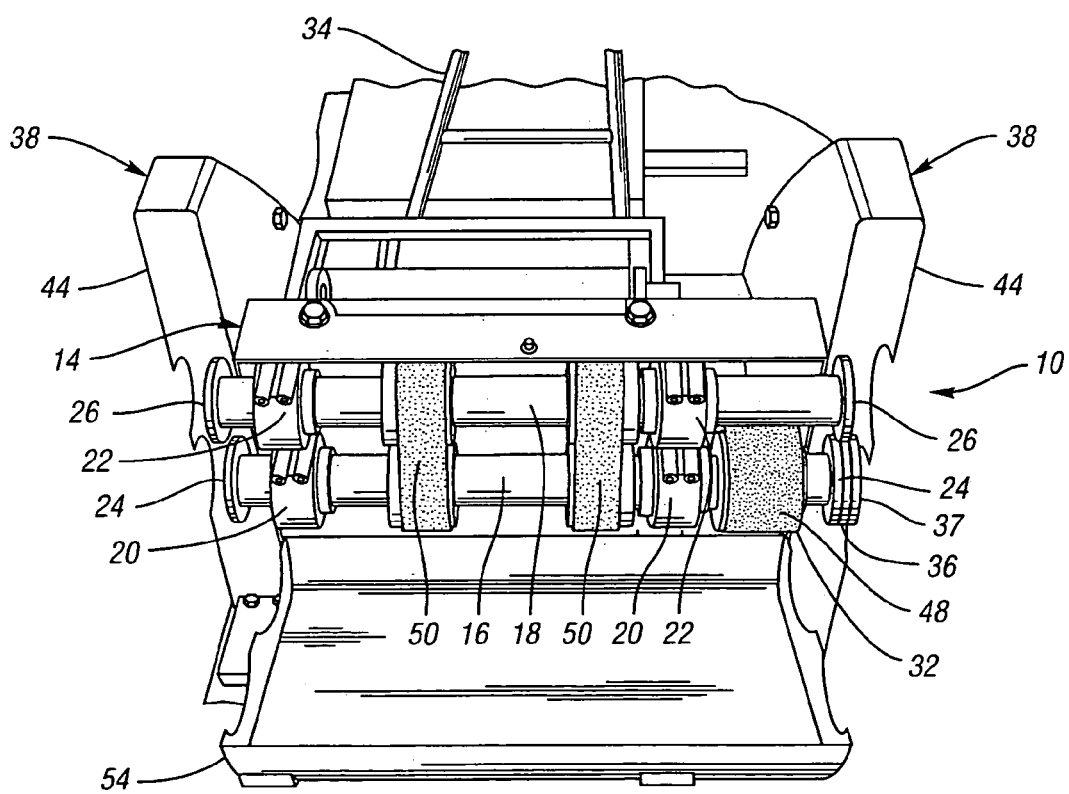
FIG. 8 is a view similar to FIG. 7 but with the lower cover in an open position to provide access to the drive mechanism from below.

As shown in FIGS. 2 and 3 as well as FIG. 1, the saw also includes a blade support frame 14 mounted on the main support frame 12 for movement as shown in FIG. 3 between an upper idle position illustrated by solid line representation and a lower cutting position illustrated partially by phantom line representation. As best illustrated in FIG. 6, low and high speed blade arbors 16 and 18 are rotatably mounted on the blade support frame 14. More specifically, as illustrated in FIG. 8, the low speed blade arbor 16 is rotatably mounted on the blade support frame 14 by a pair of spaced bearings 20 and the high speed blade arbor 18 is rotatably mounted on the blade support frame by a pair of spaced bearings 22. These low and high speed blade arbors 16 and 18 shown in FIGS. 6 and 8 each have an associated arbor head 24 and 26, as shown in FIGS. 4 and 5, for selectively and alternately mounting either a low speed concrete cutting blade 28 (FIG. 4) or a high speed cutting blade 30 (FIG. 5). The low speed cutting blade 28 or high speed cutting blade 30 are selectively and alternately mounted on the associated arbor head as is hereinafter more fully described without interference with the other arbor head so that cutting can be performed at the required speed for the specific cutting operation required. It should be appreciated that in some applications the same rotary blade may be used in both low and high speed cutting operations which are performed by merely switching the arbor head on which the cutting blade is mounted.

A drive mechanism 32 of the saw is illustrated in FIGS. 6 and 8 and rotatively drives the low and high speed blade arbors 16 and 18 such that concrete cutting can be performed by the blade mounted on the selected arbor head 24 or 26 for either low or high speed rotation as required by the cutting operation to be performed.

The concrete cutting saw 10 illustrated generally in FIG. 1 can be electrically powered or can be powered by gasoline or diesel, etc. and, as previously mentioned, will normally be self propelled by driving of one or more drive wheels 13. Movement of the blade support frame 14 between the upper idle position and the lower cutting position will normally be performed by a power operated hydraulic cylinder although other movement can also be provided such as a manual operation or other power driven operations even though the hydraulic driving is preferred. Also, the speeds of rotation of the low and high speed arbors can be varied as required, although it has been found that a low speed of approximately 1,750 revolutions per minute and a high speed of 2,500 per minute provide good speeds for general purpose cutting. Of course, different speeds can also be utilized for saws designed to provide specific types of cutting.

As shown in FIG. 1 and FIGS. 4 and 5, the pair of low and high arbor heads 24 and 26 are located at one lateral side of the saw respectively in rear and forward positions although reverse positioning is also possible. Actually, the low and high speed blade arbors 16 and 18 shown in FIGS. 6 and 8 each have a pair of arbor heads 24 and 26 respectively located at opposite lateral sides of the saw so cutting can be performed on either lateral side of the saw as it is moved in a forward direction. During the cutting, a pointer 34 is movable from an upper stored position shown in FIG. 1 to a lower use position partially shown in FIG. 6 and is moved along a line provided on the surface to be cut with the spacing between the pointer and either lateral side of the saw being selected so as to provide the proper location of cutting.

As shown in FIGS. 4 and 5, the pair of low and high speed arbor heads 24 and 26 at each lateral side of the saw is utilized with a spacer 36 and a collar 37 that mount the associated saw blade 28 or 30 on either the low or high speed arbor head. The arbor heads have outer flat faces coplanar with each other and the spacer 36 is located between the arbor head 24 or 36 so that the saw blade 28 or 30 is spaced outwardly from the other arbor head not being utilized such that there is no interference. The collar 37 has a suitable threaded connection for securing the saw blade for the cutting operation. Of course, the same spacer 36 and same collar 37 can be utilized on either arbor head or different spacers and collars can also be utilized on the pair of arbor heads if desired.

Figure 7:
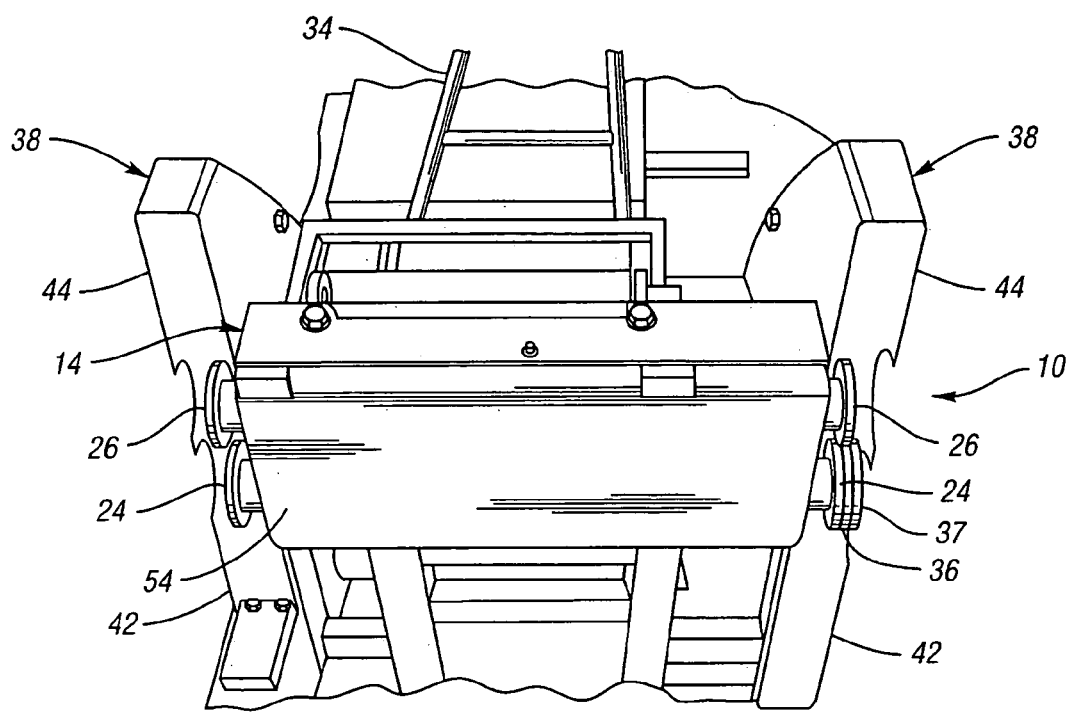
FIG. 7 is a view of the saw taken from the front looking upwardly to illustrate a lower cover in a closed position that protects the drive mechanism from debris.

As best illustrated in FIG. 7, the saw 10 includes a pair of blade covers 38 for covering either a low speed cutting blade or a high speed cutting blade mounted on one of the arbor heads as previously described. Actually, one of the covets is sized for a small diameter saw blade and the other is sized for a large diameter saw blade. Cover supports 40 shown in FIG. 2 project upwardly and are received within support pockets in the cover used. Each cover has a rear portion 42 as shown in FIG. 1 and has a front portion 44 that can be pivoted upwardly about a hinge 46 so that the blade being utilized can be moved closer to a vertical wall adjacent which the cutting is to be performed. The sizes of the covers can be constructed so that a large blade cannot be mounted on the front high speed arbor and rotatively driven too fast.

As shown in FIG. 8, the drive mechanism 32 includes a drive belt 48 that rotatively drives the rear low speed arbor 16 outboard from one of the bearings 20. Between the pair of bearings 20 of the low speed blade arbor 16, a pair of drive belts 50 rotatively drive the front high speed arbor 18. More specifically, the belts 50 are driven by larger pulleys on the low speed blade arbor 16 and rotatively drive smaller pulleys on the high speed blade arbor 18 in order to provide the greater speed of rotation. The pair of drive belts 50 drive the high speed blade arbor 18 between the pair of bearings 22 that provide its rotational support on the blade support frame 14.

As shown in FIG. 2, the blade support frame 14 includes an upper cover 52 illustrated in a closed position for enclosing the drive mechanism 32 and has an open position shown in FIG. 6 for providing access to the drive mechanism for any required maintenance or repair.

Furthermore, as shown in FIG. 7, the blade support 14 also includes a lower cover 54 having a closed position shown in FIG. 7 for enclosing the drive mechanism 32 and has an open position shown in FIG. 8 for providing access to the drive mechanism for any required maintenance or repair.

The concrete cutting saw of the invention thus provides easy switching of the rotational speed of the cutting blade with a relatively uncomplicated construction that can be easily serviced and repaired.

While the preferred embodiment for carrying out the invention has been described in detail, those familiar with the art to which this invention relates will recognize various alternative ways for practicing the invention as defined by the following claims.

What is claimed is:

1. A concrete cutting saw comprising:
   a main support frame having wheels for moving the saw in preparation for cutting, during cutting, and after a concrete sawing operation;

a blade support frame mounted on the main support frame for movement between an upper idle position and a lower cutting position;

low and high speed blade arbors rotatably mounted on the blade support frame, and the low and high speed blade arbors each having an associated arbor head for selectively and alternately mounting either a low speed concrete cutting blade or a high speed concrete cutting blade on the blade support frame without any blade interference with the other arbor head; and a drive mechanism for simultaneously rotatively driving the low and high speed blade arbors respectively at low and high speeds such that concrete cutting can be performed by the blade mounted on the selected arbor head for either low or high speed rotation as required by the cutting operation to be performed.

2. A concrete cutting saw as in claim 1 wherein the pair of arbors heads are located at one lateral side of the saw.

3. A concrete cutting saw as in claim 1 wherein the low and high speed blade arbors each have a pair of arbor heads respectively located at opposite lateral sides of the saw so cutting can be performed on either lateral side of the saw.

4. A concrete cutting saw as in claim 1 wherein the pair of arbors heads are located at one lateral side of the saw and further including a spacer and a collar for mounting the concrete cutting blade on the selected arbor head without interfering with the other arbor head.

5. A concrete cutting saw as in claim 1 further including a blade cover for covering the rotary blade mounted on the associated arbor head.

6. A concrete cutting saw as in claim 1 wherein the drive mechanism includes a drive belt for rotatively driving one of the blade arbors and a pair of drive belts that extend between the low and high speed blade arbors so both blade arbors are rotatively driven.

7. A concrete cutting saw as in claim 6 wherein the blade support frame includes an upper cover having a closed position for enclosing the drive mechanism and having an open position for providing access to the drive mechanism.

8. A concrete cutting saw as in claim 6 wherein the blade support frame includes a lower cover having a closed position for enclosing the drive mechanism and having an open position for providing access to the drive mechanism.

9. A concrete cutting saw as in claim 6 wherein the blade support frame includes upper and lower covers each of which has a closed position for enclosing the drive mechanism and an open position for providing access to the drive mechanism.

10. A concrete cutting saw comprising:

a main support frame having wheels for moving the saw in preparation for cutting, during cutting, and after a concrete sawing operation;

a blade support frame mounted on the main support frame for movement between an upper idle position and a lower cutting position;

low and high speed blade arbors rotatably mounted on the blade support frame, the low and high speed blade arbors each having a pair of arbor heads respectively located at opposite lateral sides of the saw, and one of the pair of arbor heads at either lateral side of the saw selectively and alternately-mounting either a low speed concrete cutting blade or a high speed concrete cutting blade without any blade interference with the other arbor head; and a drive mechanism for simultaneously rotatively driving the low and high speed blade arbors respectively at low and high speeds such that concrete cutting can be performed by the blade mounted on the selected arbor head at either low or high speed rotation as required by the cutting operation to be performed.

11. A concrete cutting saw comprising:

a main support frame having wheels for moving the saw in preparation for cutting, during cutting, and after a concrete sawing operation;

a blade support frame mounted on the main support frame for movement between an upper idle position and a lower cutting position;

low and high speed blade arbors rotatably mounted on the blade support frame, the low and high speed blade arbors each having a pair of arbor heads respectively located at opposite lateral sides of the saw, and a spacer and a collar for selectively mounting either a low speed cutting blade or a high speed cutting blade on the associate arbor head at one side of the saw without any blade interference with the other arbor head on that side of the saw; and a drive mechanism for simultaneously rotatively driving the low and high speed blade arbors respectively at low and high speeds such that concrete cutting can be performed by the blade mounted on the selected arbor head at either low or high speed rotation as required by the cutting operation to be performed.

12. A concrete cutting saw comprising:

a main support frame having wheels for moving the saw in preparation for cutting, during cutting, and after a concrete sawing operation;

a blade support frame mounted on the main support frame for movement between an upper idle position and a lower cutting position;

low and high speed blade arbors rotatably mounted on the blade support frame, the low and high speed blade arbors each having a pair of arbor heads respectively located at opposite lateral sides of the saw, and a spacer and a collar for selectively mounting either a low speed cutting blade or a high speed cutting blade on the associate arbor head at one side of the saw without any blade interference with the other arbor head on that side of the saw;

a drive mechanism including a drive belt for rotatively driving one of the blade arbors and a pair of drive belts that extend between the low and high speed blade arbors such that the low and high speed blade arbors are rotatively driven at low and high speeds;

the blade support frame including upper and lower covers each of which has a closed position for enclosing the drive mechanism and an open position for providing access to the drive mechanism; and a pair of blade cover respectively located at opposite lateral sides of the saw to cover either a low speed blade or a high speed blade mounted on the associated arbor head.

* * * * *